(12) United States Patent
Hewitt et al.

(10) Patent No.: US 8,009,814 B2
(45) Date of Patent: Aug. 30, 2011

(54) METHOD AND APPARATUS FOR A VOICE PORTAL SERVER

(75) Inventors: Dale Robinson Hewitt, Eastleigh (GB); William John Izard, Sydney (AU); Matthew James Ponsford, Sydney (AU); David Seager Renshaw, Hants (GB); Samuel Jonathan Smith, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/463,605

(22) Filed: Aug. 10, 2006

(65) Prior Publication Data
US 2007/0116200 A1    May 24, 2007

(30) Foreign Application Priority Data
Aug. 27, 2005   (GB) .................................. 0517542.7

(51) Int. Cl.
*H04M 1/64* (2006.01)
*G10L 21/00* (2006.01)
(52) U.S. Cl. ..................................... 379/88.23; 704/270

(58) Field of Classification Search .... 379/88.01–88.18, 379/88.22–88.27; 704/231–232, 251, 270–275
See application file for complete search history.

(56) References Cited

U.S. PATENT DOCUMENTS

| | | | | |
|---|---|---|---|---|
| 7,065,188 B1* | 6/2006 | Mei et al. | ................... | 379/88.23 |
| 7,136,804 B2* | 11/2006 | Lavallee et al. | .................... | 704/4 |
| 7,260,530 B2* | 8/2007 | Werner | ......................... | 704/251 |
| 7,395,206 B1* | 7/2008 | Irwin et al. | ..................... | 704/270 |
| 7,486,780 B2* | 2/2009 | Zirngibl et al. | ............ | 379/88.17 |
| 7,602,888 B2* | 10/2009 | Vu | .............................. | 379/88.18 |
| 7,640,163 B2* | 12/2009 | Charney et al. | ............. | 704/270.1 |
| 2005/0065913 A1* | 3/2005 | Lillie et al. | ........................ | 707/3 |
| 2005/0119878 A1 | 6/2005 | Haenel et al. | | |
| 2005/0246174 A1* | 11/2005 | DeGolia | ....................... | 704/270 |

* cited by examiner

*Primary Examiner* — Davetta W Goins
*Assistant Examiner* — Mohammad Islam
(74) *Attorney, Agent, or Firm* — Winstead, P.C.

(57) ABSTRACT

Method, system, and computer program product for building a voice prompt menu for a collection of portlets by acquiring a list of portlets, building a voice menu comprising voice menu items to activate each of the portlets, acquiring a portlet profile containing customization information, and adapting the voice menu using the customization information in the portlet profile. The web portlet may define custom characteristics for consideration by the voice aggregator, for instance, in the positions for its menu items in the hierarchy of the voice portal menu.

15 Claims, 4 Drawing Sheets

METHOD AND APPARATUS FOR A VOICE PORTAL SERVER

FIELD OF THE INVENTION

The invention relates generally to a method and apparatus for a voice portal server, and more particularly relates to a method and apparatus for a voice portal server for web portal applications.

BACKGROUND

Many mobile employees spend a considerable amount of time in cars or in other venues where a voice telephone is the only viable means of communication and the only way to access remote information sources. As self-service access to business applications becomes essential to more and more jobs, automated voice access becomes a key requirement. It is estimated that around half of cellular phone calls originate from automobiles. For a large segment of the professional workforce, the mobile phone has opened up hours of weekly commuting time for productive business purposes. Companies that offer telephone access derive a competitive advantage over those that do not. While new mobile computing devices offer remote access, their small visual displays and limited input capabilities often result in a frustrating and tedious experience. For example, the selection of items from a long list or menu is much more efficient by voice, simplifying actions such as finding a name in an address book, selecting a date on a calendar, or finding a note with a specific subject line.

Some employees with disabilities are not able to use visual interface devices, and others can not use input devices dependent on fine hand control. For these individuals, voice access is more than a competitive advantage; it is a fundamental requirement to doing their jobs. Providing voice access is much more than just voice-enabling a visual interface; it requires a basic redesign of an application for conversational interaction.

A major stumbling block for the voice interface has been the unnatural and difficult-to-understand nature of computer generated voices. Recent breakthroughs in the use of concatenative text-to-speech technology has eliminated this limitation and resulted in voice quality comparable to human speech. Speech recognition accuracy has also continued to improve, so that millions of people daily use their voice to "dial" phone numbers by saying a person's name, manage their investment portfolios, and access weather information, sports scores and other information. In addition to technology improvements, the steady refinement of conversational dialogue design has resulted in a much more efficient and pleasant user experience than was provided by earlier voice activated systems. Advances in hardware have also made it possible to deploy automated support for large numbers of simultaneous callers without large capital investments. In particular, the cost of CPU processing power, memory, and telephony interface cards have been falling by the rule of Moore's Law.

An important piece to fall into place has been the availability of VoiceXML, an open standards-based voice application design protocol that is supported by all major speech technology suppliers. This standard was designed to allow voice applications to run on all enterprise-quality computer hardware and operating system platforms. Companies can be sure that their investment in a VoiceXML application infrastructure won't lock them into a single supplier for critical system components. Voice application development had traditionally required a variety of skills, knowledge and programming techniques, including: specific Integrated Voice Response (IVR) application development environments; interfacing between specific IVR environment and middleware applications; using speech recognition and speech synthesis technologies; conversational design; and middleware design.

VoiceXML was introduced specifically to eliminate the need for proprietary IVR application design environments, to automatically provide the integration to middleware using the view-and-form based model of Web application design, and to create a standardized interface to speech recognition and speech synthesis technologies. VoiceXML enables voice application servers to integrate voice interface capabilities in the same way that web application server integrate HTML interface capabilities. These protocols provide a modular application design environment with common components sharable across all access modalities.

It is not just voice technology that has being developing, so too has user interface technology in the form of web portals. Portals serve as a simple, simultaneous unified access point to several web applications. Portals provide a runtime platform and tools that give a consistent presentation view across multiple pages, navigation control to access applications, and personalized selection and customization of content. IBM WebSphere Portal Server infrastructure accomplishes this by providing functions that: provide access to information across a spectrum of users, devices, and customization options; integrate and automate business processes; and build, connect and manage applications. Pervasive portal offerings are part of a new generation of applications designed to obtain information and execute transactions from a variety of remote access devices. In addition, the portal platform is ideal for supporting both voice and visual access through a common personalization store-and-shared business logic.

Most existing automated voice solutions have been created using proprietary voice application environments combined with custom interfaces to back-end business logic and data. These custom interfaces are difficult to integrate with traditional GUI Web access solutions. However, IBM WebSphere Voice Application Access (WVAA) combines the modular application design of IBM WebSphere Portal Server with VoiceXML to add voice access to the other modalities supported by WebSphere Portal Server. By building on VoiceXML, not only is the growing community of voice application developers able to directly leverage the WVAA platform but platform customers should be able to choose between leading speech recognition and text-to-speech offerings.

Voice interfaces, such as those provided with WVAA have significant advantages over pure visual web applications in a portal. Graphical user interfaces (GUIs) tend to have a large amount of text on every screen that can saturate the user. Most people follow spoken dialogs more easily than written instruction. Perhaps the best advantage is dialogue focus, which means that prompts lead users through a conversation step-by-step. On the other hand, in natural conversations people answer even simple questions in a large variety of ways often outside the scope of the question. For example, they may answer a question and then explain their answer. Designing automated systems to be able to "understand" most of these arbitrary inputs would generally be quite complex and impractical. Consequently, it is important to channel people's spoken input to match the computer's voice recognition strengths.

Voice interfaces designed for telephony access have evolved significantly other the past few years based on the experiences of many application deployments. Some of the most important things learned are that conversational flow must be efficient, consistent, and intuitive. Use confidence scores to avoid confirming every entry, make sure navigational commands are consistent throughout all applications in the portal; and ensure that conversational flow "makes sense" to most users. Prompts must be carefully crafted, short but not ambiguous. It should be clear to most users exactly what to say to the system. Help prompts must be short. Users can simply not remember much more than one piece of information per prompt. The system should "reveal itself" to users at appropriate times. Context-dependent help can be used when the conversation bogs down and shortcuts can be offered when things are going well, to help users learn the system incrementally.

Another difference between visual and voice interfaces is portal navigation. Visual portal design is based on the concept of presenting a top level view in a single a viewable page, but most users do not care that components on a page are made from different portlets. The navigational problem for visual portlets is finding the page that contains the right application. In order to support a large number of applications, the portal can group similar pages into a page group. These visual concepts are not useful to a voice interface. While there will be some overlap, for example in that major categories may be the same between visual and voice, the navigational menu structure for voice is likely to be quite different for several reasons: there will be some visual-only portlets and some voice-only portlets; applications may be put on a page because they fit well together visually, but a different organization will make more sense in a voice menu; and many voice targets may be implemented as shortcuts rather than normal menu choices in order to keep prompts short. In other words, a voice interface is much more than simply a voice enablement of a visual interface.

The majority of voice applications will be directed dialogue designs, as these are the simplest to create and in many cases the easiest to use. Directed dialogue designs are controlled by the automated system, offering a specific set of choices. This paradigm, also known as system initiative, is the easiest for users to learn, but for complex applications it can be inefficient and tedious. Mixed initiative dialogue designs allow both the system and the user to take control of the dialogue as appropriate. Because the majority of voice access applications will be directed dialogues. IBM WebSphere Voice Application Access provides a superior application design environment for directed dialogue applications. The emphasis is on tools that facilitate iterative implementation, debugging and enhanced designs, using best practices for conversational dialogues.

FIG. 1 shows a Web browser's rendering of an example web portal 20 for two portlets 24 and 26 on a page 1 of the portal. The web aggregator has rendered the title banner, the menu of pages on the left hand side, provided a title bar (the 'skin') for each portlet, and asked each portlet to render itself. Pages 2 and 3 are not selected and are shown grayed in. Portal 24 is an email portal, menu items 24A, 24B and 24C are 'get email', 'compose' and 'move to folder' respectively. Portal 26 is a calendar portal, menu items 26A, 26B and 26C comprise: 'new entry'; 'new web conference'; and 'edit' respectively. Other menu items can be seen on the figure but are not referenced. Functional and sample voice application portlets are included in the system installation or available by download. Examples of the key functional portlets are: Lotus Notes R5 access to e-mail and calendar. Other portlets could be Lotus Notes R5 access to contact information; and Microsoft Exchange 2000 access.

FIG. 2 shows the hierarchy of elements for the example web portal 20 having pages 1, 2, and 3 in FIG. 1. Page 1 comprises two portals 24 and 26. Both portals comprise at least three menu items 24A, 24B, 24C and 26A, 26B, 26C. Further portlets 27 and 28 and corresponding menu items are not elaborated on but could exist in many combinations. Existing voice aggregation of the web portal would generate a voice portal menu that follows the same hierarchy, for instance, giving the telephone user a first choice of portal pages 1, 2, or 3. After, for example, page 1 is chosen, giving the user a second choice of portlet 21, 22, or 23. After, for example, portlet 21 is chosen, giving the user a third choice of which menu item in the portlet, e.g. 26A, 26B or 26C. In a voice environment having three consecutive groups of menu choices to get to the right menu item can be tedious.

SUMMARY

According to a first aspect of the present invention there is provided a method of building a voice prompt menu for a collection of portlets comprising acquiring a list of portlets; building a voice menu comprising voice menu items to activate each of the portlets; acquiring a portlet profile containing customization information; and adapting the voice menu using the customization information in the portlet profile.

It is a feature of the present embodiment that the web portlet can define custom characteristics for consideration by the voice aggregator, for instance, in the positions for its menu items in the hierarchy of the voice portal menu.

The present embodiment extends the portal architecture, allowing portlets to specify characteristics that affect how the entire page is rendered. The list of characteristics preferred by a portlet is called the 'portlet profile'. The view aggregator creates markup based on the portlets' preferred characteristics, and deals with any conflicting characteristics between portlets.

Preferably the adapting step adds a voice menu item for activating a function within a portlet. For example, the portlets comprise a hierarchy of menu items, the prior built voice menu can include a top level menu item list for all portlets and the additional menu item is for a menu item at a lesser level within one or more of the portlets.

Advantageously the step of adding the voice menu item to the voice menu adds a further option to the voice menu. An alternative is to replace the option for the portlet so that the portlet top level menu is no longer accessible.

Suitably the adapting step replaces a default DTMF key for activating a particular menu item with a DTMF key designated in the profile. The adapting step may add a voice recognition grammar to the voice menu.

BRIEF DESCRIPTION OF THE DRAWINGS

Embodiments of the invention will now be described by means of example only, with reference to the accompanying drawings in which.

DETAILED DESCRIPTION

Figure 1:
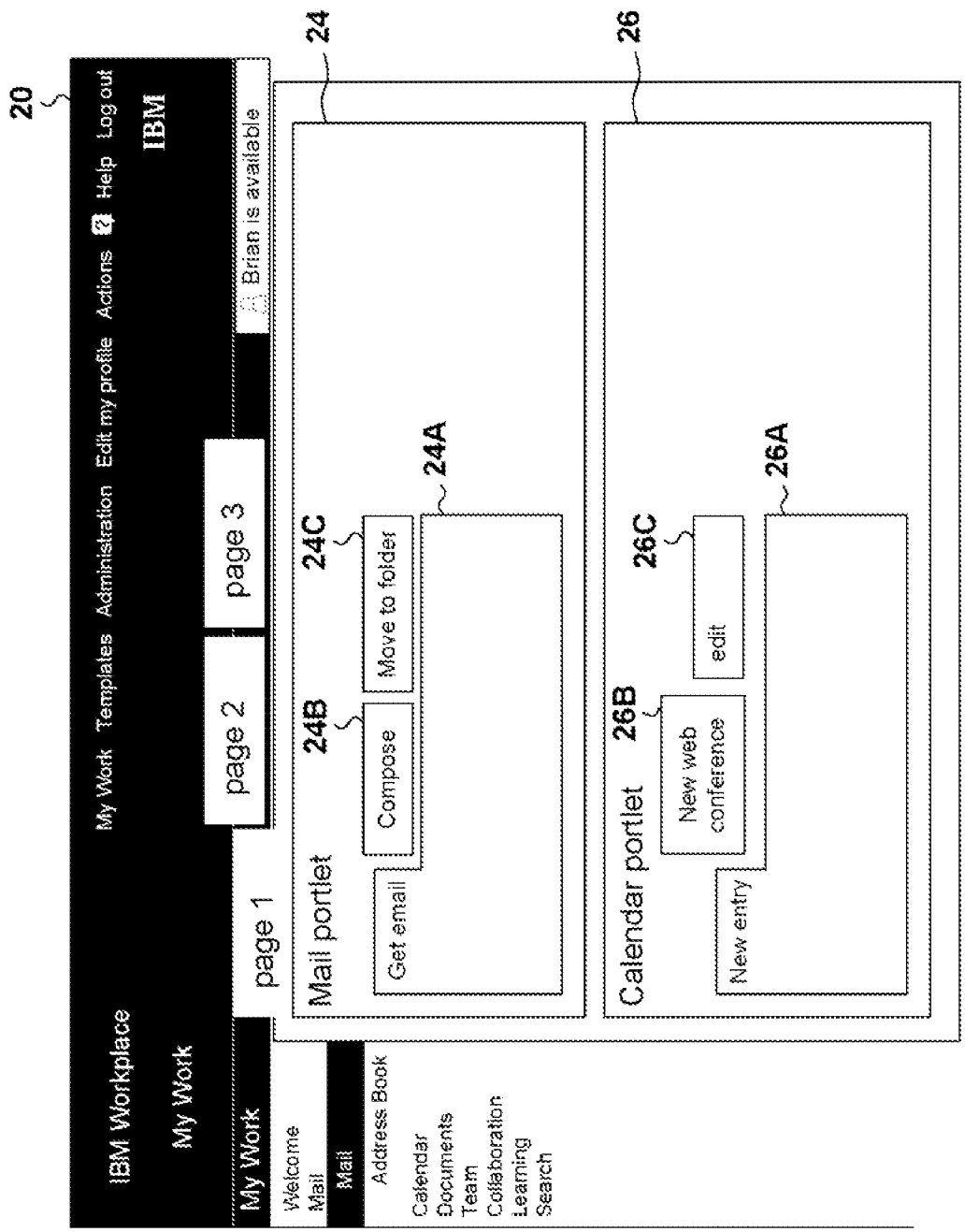
FIG. 1 illustrates a web browser generated web portal page comprising two portlets from an example portal.
Figure 2:
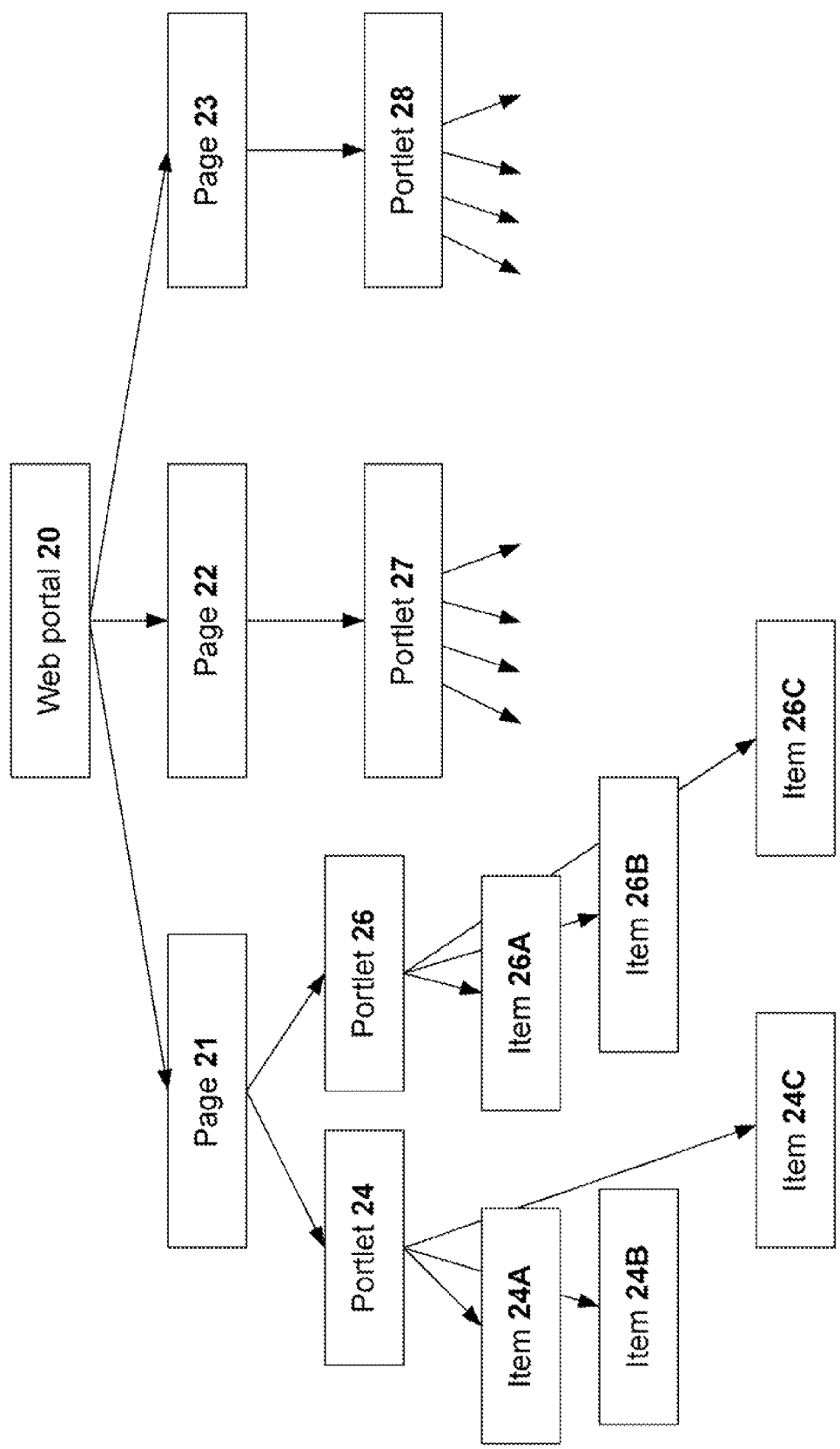
FIG. 2 illustrates a hierarchy of elements in the example web portal.
Figure 3:
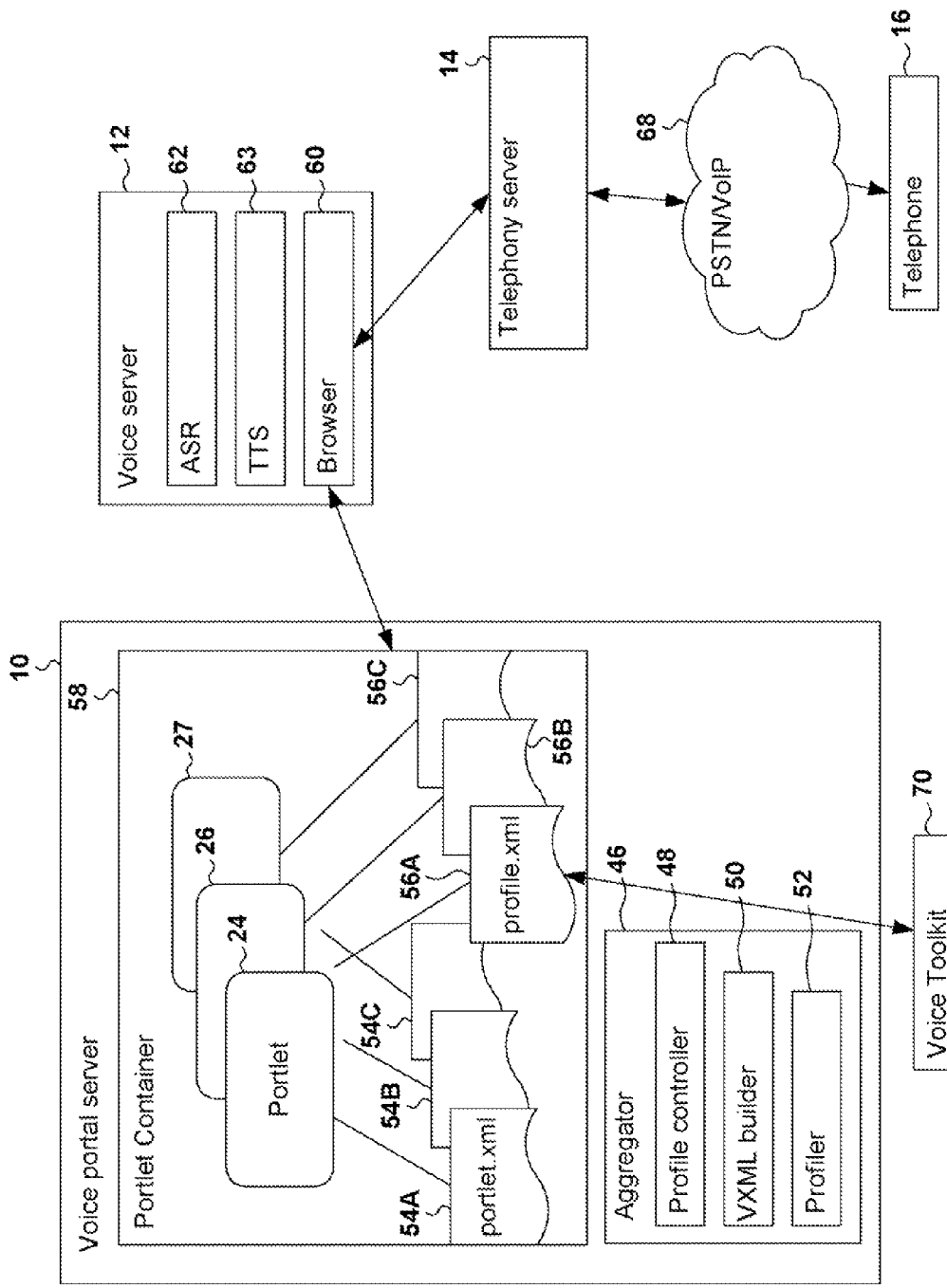
FIG. 3 is a schematic of the apparatus of preferred embodiment of the invention including a voice portal server.

FIG. 3 shows components of a preferred embodiment of the invention, comprising voice portal server 10; voice server 12; telephony server 14; and telephone 16. HTTP VoiceXML markup 11 is delivered to a voice server 12 including a VoiceXML browser and underlying automatic speech recognition and text-to-speech (ASR/TTS 62) technologies. Voice server 12 is based on IBM Voice Server v5.0. Telephony server 14 (based on IBM WebSphere Voice Response v3.1 (WVR)) provide connectivity with the user telephone 16 through telephone network 18. Telephone network 18 is PSTN or VoIP.

Voice portal server 10 may be based on IBM WebSphere Voice Application Access v2.0 (WVAA). Voice portal server 10 comprises: portlets 24, 26, 27, 28 and a voice aggregator 46. The portlets deliver VoiceXML markup, and the voice aggregator consolidates VoiceXML markup from all the portlets and creates a single complete VoiceXML document including support for a global main menu. Portlets 24, 26 and 27 have associated portlet.xml files 54A, 54B and 54C and profiles 56A, 56B and 56C all contained in portlet container 58 within the voice application server 10.

A portal server is an application server that can aggregate the content produced by several small applications (portlets) in a single view. A voice portal server aggregates content into a single voice presentation. Within a portal server, the portlet container controls the lifecycle of each portlet. Portlets can be placed on pages. Users can be given access permissions for pages and portlets. The portlet container ensures pages and portlets are accessible only to those with the correct permissions.

The standard portlet specification (JSR168) already states that each portlet has a deployment descriptor file called portlet.xml (see 54A, 54B and 54C). These files provide information about the portlets to the portlet container, such as the portlet classname, the portlet title, and the modes supported. This embodiment introduces another resource for voice portals, a 'portlet profile' (profile.xml) which provides information about the portlet to the aggregator. A portlet profile specifies a list of characteristics that the aggregator will observe and use in the voice menu aggregation. The aggregator will vary its output according to these characteristics.

Aggregator 46 is the component that is in charge of rendering a single portal voice interface based on the pages and portlets. Different aggregators may be able to render the view for different markup languages (e.g., html, wml, vxml). Voice aggregator 46 is the runtime module that exposes the voice applications enabled for the current user and implements the voice menu needed to navigate to a specific application. In the present embodiment, the voice aggregator 46 comprises profile controller 48; VoiceXML builder 50; and profiler 52.

Profile controller 48 acquires the profile information for each portlet.

VoiceXML builder 50 defines default values for each portlet and generates the default VoiceXML.

Profiler 52 adapts the default VoiceXML application according to the information in the profiles acquired by the profile controller 48.

Voice server 12 comprises browser 60, automatic speech recognition (ASR) 62, and text-to-speech engine (TTS) 63. Voice server 12 connects to a user telephone 66 through telephony server 14.

Telephony server 14 provides the technology to connect to a telephony network such as PSDN or VoIP and is based on the telephony interface from IBM WebSphere Voice Response v3.1.

VoiceXML markup is sent by the aggregator 46 to compliant VoiceXML browser 60 using standard HTTP connectivity. The VoiceXML browser 60 works with ASR 62 and TTS 63 to interpret spoken input and generate voice output. The browser 60 can also accept DTMF from a telephone keypad as input and use pre-recorded audio files for output. In order to interpret voice input, ASR 62 uses active vocabularies that identify recognizable words. These vocabularies also specify allowable word sequences. This combination of vocabulary and specific word ordering is called a speech recognition grammar. Each word in a grammar is represented by a spelling, but it is actually the word's pronunciation that is used by the ASR 62. Although both ASR 62 and TTS 63 speech technologies have large dictionaries of word pronunciations, applications will often use words or abbreviations outside the dictionary that require the definition of new pronunciations.

By default, the aggregator 46 uses the title of the portlet as the activation grammar. In the present embodiment, the voice portal aggregator supports an 'activation grammar' characteristic contained by the profile for each portlet. The activation grammar specifies what a user can say to activate the portlet. Rather than accept the default, an email portlet may specify that its activation grammars are 'Messages' or 'Mail'. The aggregator will enable these grammars, stored in the profile for each portlet, to activate the email portlet.

Tools are needed to facilitate building grammars and pronunciations, as well as to create good quality conversational call flows. Voice toolkit 70 is based on IBM Voice Application Access Toolkit 70. Voice toolkit 70 is a collection of tools for creating and debugging voice aggregation, voice portlets and customizing WVS speech technologies.

Figure 4:
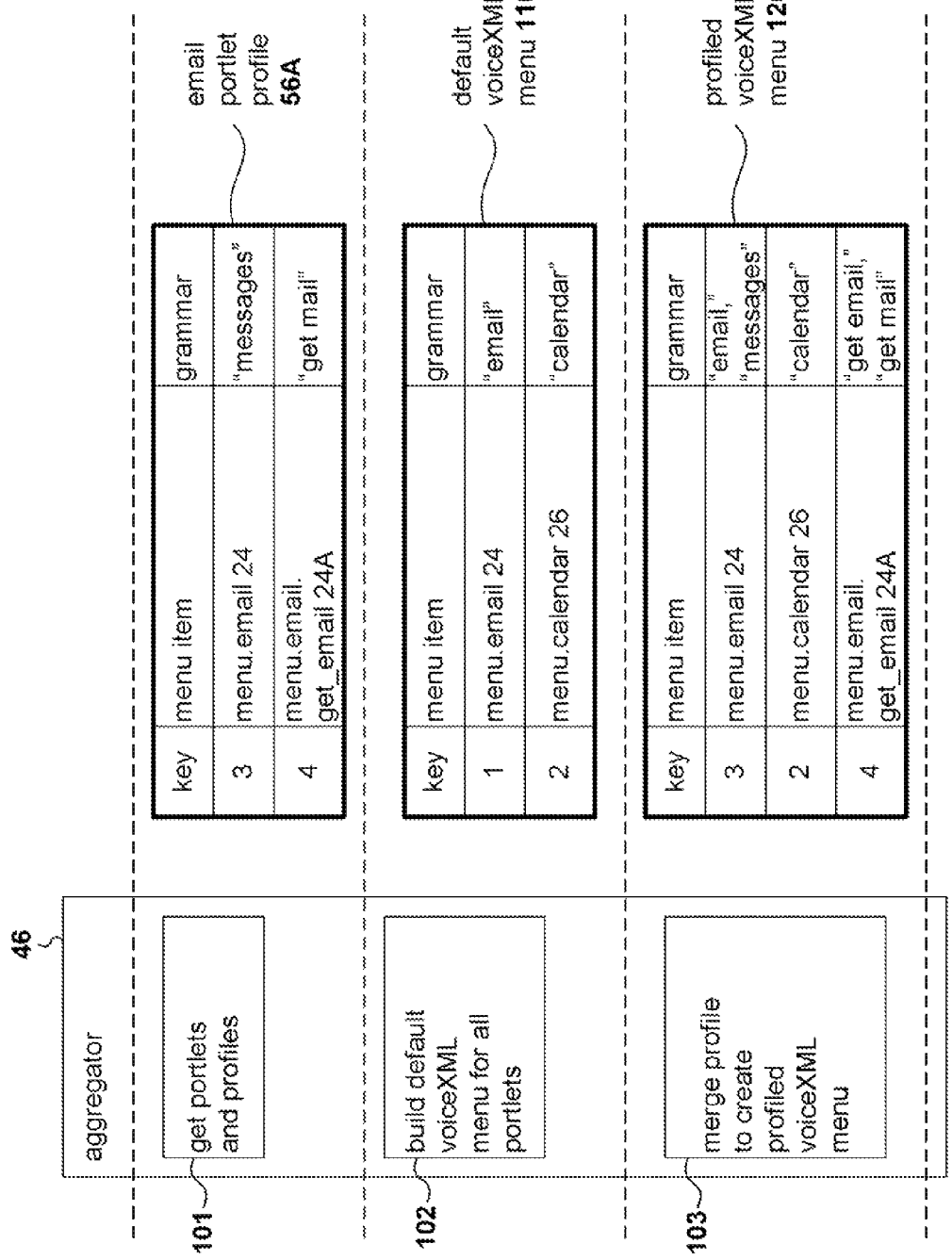
FIG. 4 is a more detailed system view of method of the preferred embodiment.

FIG. 4 illustrates the method of the aggregator with the ongoing example.

In step 101, the aggregator 46 acquires the portlets to be aggregated and retrieves any associated profiles 56A and 56B. In this case, both email portlet 24 and calendar portlet 26 are retrieved. Email portlet profile 56A is retrieved; the calendar portlet profile is considered empty in this example.

Email portlet profile 56A identifies the default top level menu item 24 designated by the label "menu.email" and associates two preferences with this menu item. The first preference is to associate the top level menu item with DTMF key "3" instead of the default DTMF key. The second preference is to associate an additional grammar: "messages" with the top level menu item.

Email portlet profile 56A also identifies menu item 24A below the top level menu designated by the label "menu.e-mail.get_email" and associates two preferences with this menu item. The first preference is to associate menu item 24A with DTMF key "4" instead of the default DTMF key. The second preference associates a grammar: "get mail" with this menu item. Note the difference between the default grammar derived from the name "get email" and the profile grammar "get mail".

In step 102, the aggregator builds default VoiceXML menu 110 based on the portal information. In this example default VoiceXML menu 110 is shown in table form rather than pure XML. Aggregator 46 selects the first portal, in the example the Email portal 44A, assigns a first DTMF key, in the example "1" to the top level menu item 24A. Aggregator 46 further assigns to the menu item 24 a grammar determined by the name, in the example "email". Aggregator 46 then selects the second portal, in the example the Calendar portal 44B, assigns a second DTMF key, in the example "2", to the top level menu item 26. Aggregator 46 further assigns to top level menu item 26 a grammar determined by the name, in the example "calendar".

In step 103, the aggregator merges profile 56A with the default VoiceXML menu 110 to create profiled VoiceXML menu 120. For menu item 24, default DTMF key "1" is changed to profiled DTMF key "3" and "messages" is added to the grammar. No change is made to menu item 26. An additional menu item 24A labeled "menu.email.get_email" is added to the menu 120 and given a default DTMF key of 4 (next available key) and a default grammar "get email" corresponding to the name. A further grammar "get mail" is added from the profile.

There will be occasions where two portlets on a page have conflicting profile characteristics. For example, two voice portlets may both request a hotkey characteristic of '3' Both wish to be activated on a DTMF key of 3. In this case priority is based upon the position of portlets on the web page. Priority will run from left to right, then top to bottom.

In this embodiment, portlet characteristics that have been modified or added to by the profile include the DTMF hot key, the activation grammar, and the hierarchy of the menu items. Other characteristics such as the order of play out of the menu items could be modified or added.

It will be clear to one skilled in the art that the method of the present invention may suitably be embodied in a different logical arrangement to that shown in FIG. 3.

It will also be clear to one skilled in the art that the logic arrangement of the present invention may be suitably embodied in a logic apparatus comprising logic means to perform the steps of the method and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared, or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer service on demand.

It will also be appreciated that various further modifications to the preferred embodiment described above will be apparent to a person of ordinary skill in the art.

What is claimed is:

1. A method of building a voice prompt menu for a collection of portlets, the method comprising:
   acquiring a list of portlets;
   building a voice menu comprising voice menu items to activate each of the portlets;
   acquiring a portlet profile containing customization information; and
   adapting, by a voice portal server, the voice menu using the customization information in the portlet profile.

2. A method according to claim 1, wherein the adapting step adds a voice menu item for activating a function within a portlet.

3. A method according to claim 1, wherein the customization information defines menu item position in the voice portal menu.

4. A method according to claim 1, wherein the adapting step replaces a default DTMF key for activating a particular menu item with a DTMF key designated in the profile.

5. A method according to claim 1, wherein the adapting step adds a voice recognition grammar word to the voice menu.

6. A system of building a voice prompt menu for a collection of portlets, the system comprising:
   a portlet controller for acquiring a list of portlets and acquiring portlet profiles containing customization information;
   a voice menu builder for building a voice menu comprising voice menu items to activate each of the portlets; and
   a profiler for adapting the voice menu using the customization information in the portlet profile.

7. A system according to claim 6, wherein the profiler adds a voice menu item for activating a function within a portlet.

8. A system according to claim 7, wherein the profiler adds the voice menu item as a further option to the voice menu.

9. A system according to claim 6, wherein the profiler replaces a default DTMF key for activating a particular menu item with a DTMF key designated in the profile.

10. A system according to claim 6, wherein the profiler adds a voice recognition grammar word to the voice menu.

11. A computer program product comprising a computer readable recording medium having computer readable code stored thereon for building a voice prompt menu for a collection of portlets, said computer readable code which when loaded onto a computer system and executed performs the following steps:
   acquiring a list of portlets;
   building a voice menu comprising voice menu items to activate each of the portlets;
   acquiring a portlet profile containing customization information; and
   adapting the voice menu using the customization information in the portlet profile.

12. A computer program product according to claim 11, wherein the adapting step adds a voice menu item for activating a function within a portlet.

13. A computer program product according to claim 12, wherein the step of adding the voice menu item to the voice menu adds a further option to the voice menu.

14. A computer program product according to claim 11, wherein the adapting step replaces a default DTMF key for activating a particular menu item with a DTMF key designated in the profile.

15. A computer program product according to claim 11, wherein the adapting step adds a voice recognition grammar word to the voice menu.

* * * * *